United States Patent
Madumbu et al.

(10) Patent No.: US 8,472,527 B2
(45) Date of Patent: Jun. 25, 2013

(54) HIERARCHICAL MOTION ESTIMATION USING ORIGINAL FRAME FOR SUB-SAMPLED REFERENCE

(75) Inventors: Venugopala K. Madumbu, Bangalore (IN); Raghavendra Kudva, Karanataka (IN); Anurag M. Jain, Bangalore (IN); Pramod K. Swami, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 1134 days.

(21) Appl. No.: 11/854,212

(22) Filed: Sep. 12, 2007

(65) Prior Publication Data

US 2008/0063080 A1    Mar. 13, 2008

Related U.S. Application Data

(60) Provisional application No. 60/825,433, filed on Sep. 13, 2006.

(51) Int. Cl.
*H04N 7/12* (2006.01)

(52) U.S. Cl.
USPC ................................................ 375/240.21

(58) Field of Classification Search
USPC ........... 375/240.01–240.29; 348/400.1–422.1
See application file for complete search history.

(56) References Cited

U.S. PATENT DOCUMENTS

| | | | | |
|---|---|---|---|---|
| 5,576,767 A | * | 11/1996 | Lee et al. | 375/240.14 |
| 5,581,302 A | * | 12/1996 | Ran et al. | 375/240.16 |
| 5,682,209 A | * | 10/1997 | Borgwardt | 348/699 |
| 5,731,850 A | * | 3/1998 | Maturi et al. | 348/699 |
| 5,844,613 A | * | 12/1998 | Chaddha | 375/240.12 |
| 6,625,216 B1 | * | 9/2003 | Zhu | 375/240.16 |

* cited by examiner

*Primary Examiner* — Dmitry H Levitan
(74) *Attorney, Agent, or Firm* — Robert D. Marshall, Jr.; Wade James Brady, III; Frederick J. Telecky, Jr.

(57) ABSTRACT

This invention calculates motion vectors during video encoding for sub-sampled data using a hierarchical search. The motion vector calculation employs a prior original frame as the reference frame rather than a reconstructed frame according to the prior art.

1 Claim, 5 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

HIERARCHICAL MOTION ESTIMATION USING ORIGINAL FRAME FOR SUB-SAMPLED REFERENCE

CLAIM OF PRIORITY

This application claims priority under 35 U.S.C. 119(e)(1) to U.S. Provisional Application No. 60/825,433 filed Sep. 13, 2006.

TECHNICAL FIELD OF THE INVENTION

The technical field of this invention is motion estimation in video compression.

BACKGROUND OF THE INVENTION

The final video quality in benchmarks used to evaluation real-time video encoding is evaluated separate from the amount of data processing employed. In many cases the final video quality depends upon the quality of motion estimation algorithm used in the encoder. Many real-time video encoders employ some variant of a hierarchical search block matching regardless of the particular video standard implemented.

SUMMARY OF THE INVENTION

This invention calculates motion vectors during video encoding for sub-sampled data using a hierarchical search. The motion vector calculation employs a prior original frame as the reference frame rather than a reconstructed frame according to the prior art.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
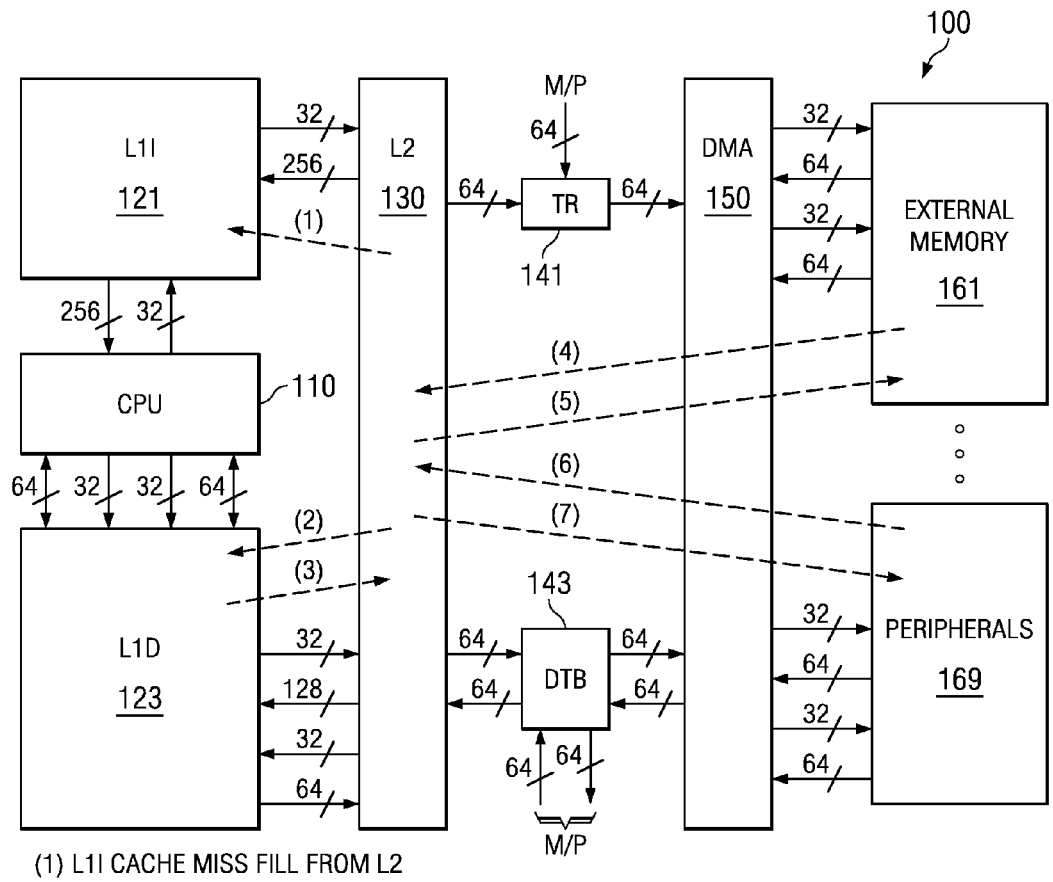
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
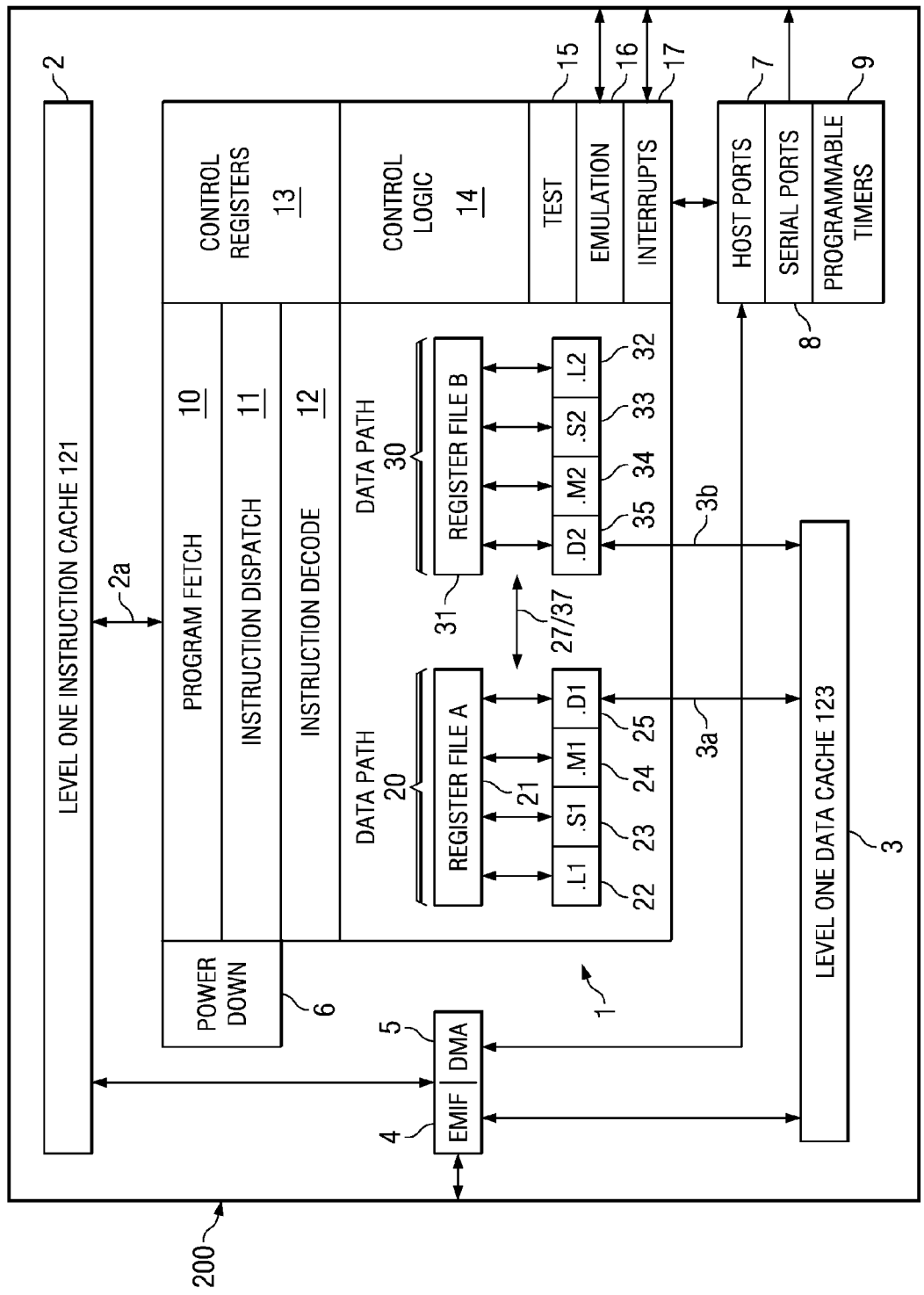
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way Very Long Instruction Word (VLIW) pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b.

Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
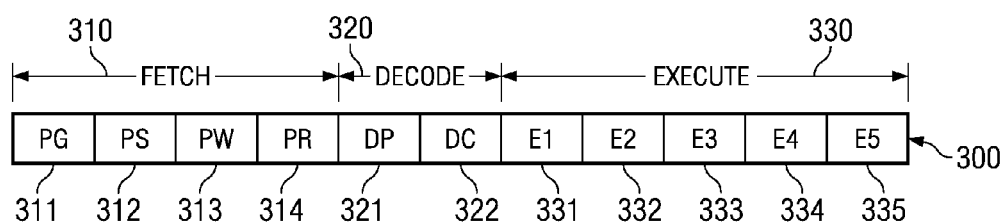
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extensions instructions, the results are written to a register file. Multiply extension instructions complete during the E4 phase 334.

During E5 phase 335, load instructions write data into a register. Load instructions complete during the E5 phase 335.

Figures 4, 5:
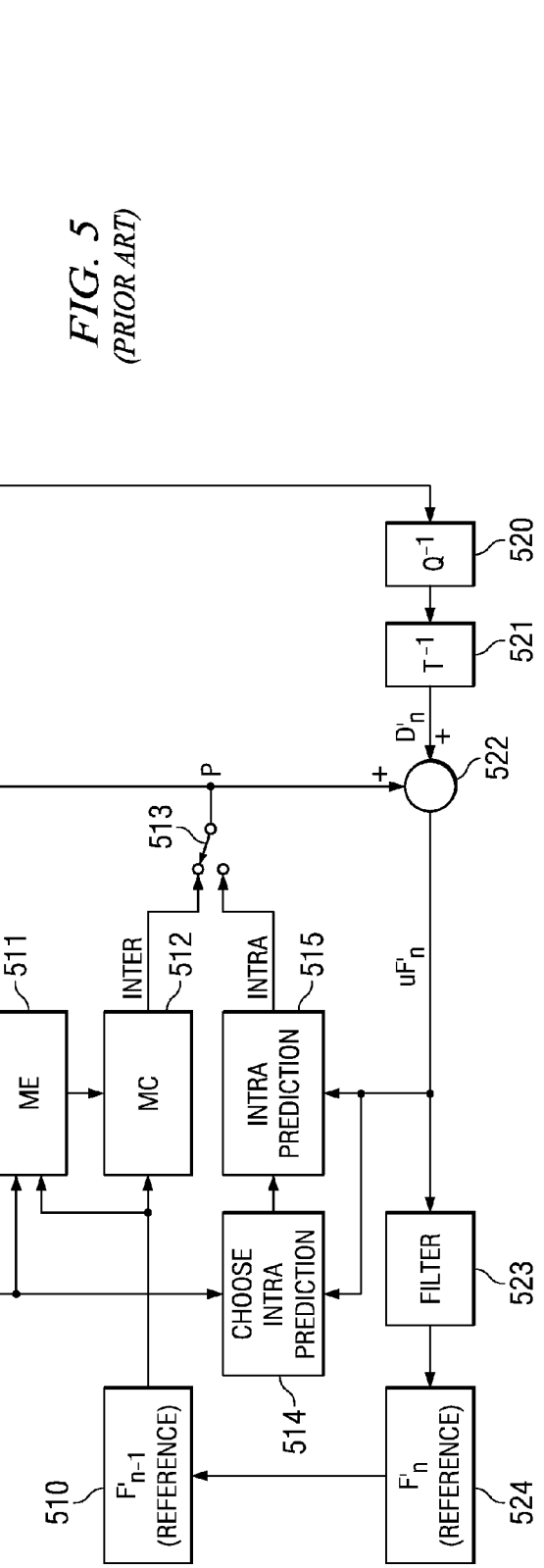
FIG. 4 illustrates the instruction syntax of the very long instruction word digital signal processor core illustrated in FIG. 2 (prior art)
FIG. 5 illustrates an overview of the video encoding process of the prior art.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the encoding process 500 of video encoding according to the prior art. Many video encoding standards use similar processes such as represented in FIG. 5. Encoding process 500 begins with the n th frame $F_n$ 501. Frequency transform block 502 transforms a macroblock of the pixel data into the spatial frequency domain. This typically involves a discrete cosine transform (DCT). This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the encoded data stream.

Video encoding standards typically permit two types of predictions. In inter-frame prediction, data is compared with data from the corresponding location of another frame. In intra-frame prediction, data is compared with data from another location in the same frame.

For inter prediction, data from n-1 th frame $F_{n-1}$ 510 and data from the current frame $F_n$ 501 supply motion estimation block 511. Motion estimation block 511 determines the positions and motion vectors of moving objects within the picture. This motion data is supplied to motion compensation block 512 along with data from frame $F_{n-1}$ 510. The resulting motion compensated frame data is selected by switch 513 for application to subtraction unit 506. Subtraction unit 506 subtracts the inter prediction data from switch 513 from the input frame data from current frame $F_n$ 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If the current frame $F_n$ and the prior frame $F_{n-1}$ are identical, the subtraction unit 506 will produce a string of zeros for data. This data string can be encoded using few bits.

The second type of prediction is intra prediction. Intra prediction predicts a macroblock of the current frame from another macroblock of that frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement intra prediction. Choose intra prediction unit 514 receives data from current frame $F_n$ 501 and the output of addition unit 522. Choose intra prediction unit 514 signals intra prediction intra predication unit 515, which also receives the output of addition unit 522. Switch 513 selects the intra prediction output for application to the subtraction input of subtraction units 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors.

Video encoders typically periodically transmit unpredicted frames. In such an event the predicted frame is all 0's. Subtraction unit 506 thus produces data corresponding to the current frame $F_n$ 501 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblock filter 523 smoothes artifacts created by the block and macroblock nature of the encoding process. The result is reconstructed frame $F'_n$ 524. As shown schematically in FIG. 5, this reconstructed frame $F'_n$ 524 becomes the next reference frame $F_{n-1}$ 510.

Figure 6:
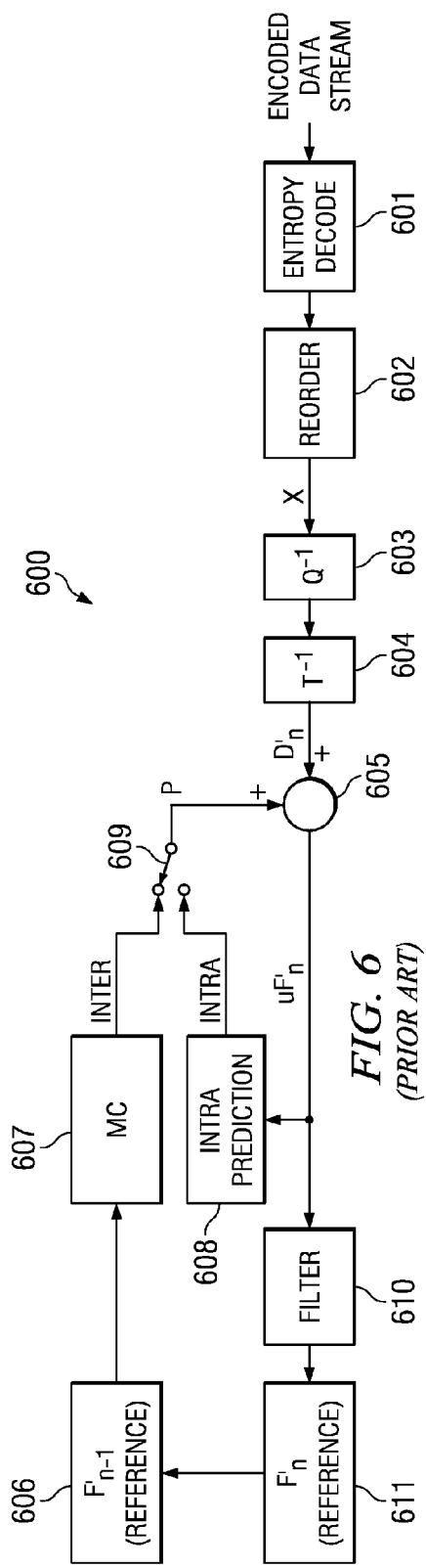
FIG. 6 illustrates an overview of the video decoding process of the prior art.

FIG. 6 illustrates the corresponding decoding process 600. Entropy decode unit 601 receives the encoded data stream. Entropy decode unit 601 recovers the symbols from the entropy encoding of entropy encoding unit 505. This invention is applicable to Context based Adaptive Binary Arithmetic Coding (CABAC) decoding. Reorder unit 602 assembles the macroblocks in raster scan order reversing the reordering of reorder unit 504. Inverse quantization block 603 receives the quantized data from reorder unit 602 and substantially recovers the original frequency domain data. Inverse frequency transform block 604 transforms the frequency domain data from inverse quantization block 603 back to the spatial domain. This spatial domain data supplies one input of addition unit 605. The other input of addition input 605 comes from switch 609. In inter mode switch 609 selects the output of motion compensation unit 607. Motion compensation unit 607 receives the reference frame $F'_{n-1}$ 606 and applies the motion compensation computed by motion compensation unit 512 and transmitted in the encoded data stream.

Switch 609 may also select intra prediction. The intra prediction is signaled in the encoded data stream. If this is selected, intra prediction unit 608 forms the predicted data from the output of adder 605 and then applies the intra prediction computed by intra prediction block 515 of the encoding process 500. Addition unit 605 recovers the predicted frame. As previously discussed in conjunction with encoding, it is possible to transmit an unpredicted or I frame. If the data stream signals that a received frame is an I frame, then the predicted frame supplied to addition unit 605 is all 0's.

The output of addition unit 605 supplies the input of deblock filter 610. Deblock filter 610 smoothes artifacts created by the block and macroblock nature of the encoding process. The result is reconstructed frame $F'_n$ 611. As shown schematically in FIG. 6, this reconstructed frame $F'_n$ 611 becomes the next reference frame $F_{n-1}$ 606.

The deblocking filtering of deblock filter 523 and deblock 610 must be the same. This enables the decoding process to accurately reflect the input frame $F_n$ 501 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

The object of motion estimation is to improve video data compression by finding a best match for a moving object in the video field. Specifying motion of a block of data from a prior frame to the current frame requires fewer bits than specifying all the data of the current frame. This requires finding a best match for a block in a current frame with a displaced block in the prior reference frame.

Finding such a best match for blocks in a prior frame and a current frame is a difficult task. A straight forward manner of finding the best match is to compare each block in the current frame with each possible displaced block in the reference frame. This comparison involves generating a measure of similarity of the blocks. It is typical to use a sum of absolute differences as this measure of similarity. The sum of absolute differences is calculated as follows:

$$M(a, b) = \sum_{block} (|p_{cur}(x, y) - p_{ref}(x - a, y - b)|) \quad (1)$$

where: $M(a,b)$ is the similarity measure for x displacement a and y displacement b; $p_{cur}(x,y)$ is the pixel value in the current frame at location (x,y); $p_{ref}(x,y)$ is the pixel value in the current frame at location (x,y); the summation is over all pixels in a block under consideration. Note that the absolute value of the difference is the same regardless of which pixel value is greater. An exhaustive algorithm calculates $M(a,b)$ for all possible values of a and b and selects the displacement pair (a,b) that generates the least sum of absolute differences as the motion vector.

Such an exhaustive search is expected to be computationally intensive. However, an exhaustive search may be justified in a code/compress and store scenario where the coding/compression takes place once but decoding/decompression takes place many times. In this scenario using large computational resources in non-real time video compression may be useful. Using an exhaustive search is much less feasible when doing real time coding/compression. Such situations will often have limited computational resources making an exhaustive search unfeasible.

Several techniques are known in the art to reduce the computation needed for motion estimation. A technique known as hierarchical search motion estimation employs a directed search. Rather than compute the measure of similarity for every possible displacement, a hierarchical search seeks to find the minimum similarity measure via a directed search. The hierarchical search calculates the similarity measure for a spatially disbursed group of pixels. Often this group of pixels tracks the direction of motion of the last motion vector. The hierarchical search spreads another pattern around the pixel of the first group with the lowest similarity measure/greatest similarity. This directed search is guaranteed to find a local minimum in the similarity measure with much less computation than an exhaustive search. This local minimum is not guaranteed to be the actual minimum. However, the speed of locating the local minimum may overcome any problem with not always finding the actual minimum.

Another computation reduction technique used sub-sampled data. Rather than compute the similarity measure for each pixel, the two blocks are sampled and only the samples are compared. As an example, an 8 by 8 block in the current frame and a corresponding 8 by 8 block in the reference frame may be sub-sampled into corresponding 4 by 4 blocks. The similarity measure is calculated using the corresponding sub-sampled 4 by 4 blocks. Many known hierarchical motion estimations algorithms use sub-sampled data, starting the search using a sub-sampled reference frame generated from the reconstructed samples of the previous reference frame. Sub-sampling the data reduces the amount of computation to calculate the similarity measure and possibly faster convergence to the local minimum.

This invention uses samples from the original frame to generate sub-sample reference frame in the Hierarchical Search Motion estimation algorithm. Samples from the original frame are used as the sub-sample reference frame because the reconstructed frame might have lost structural information. This structural information loss is most severe at low bit rates. This enables the Motion estimation to track the motion of objects accurately even at lower bit rates.

Figure 7:
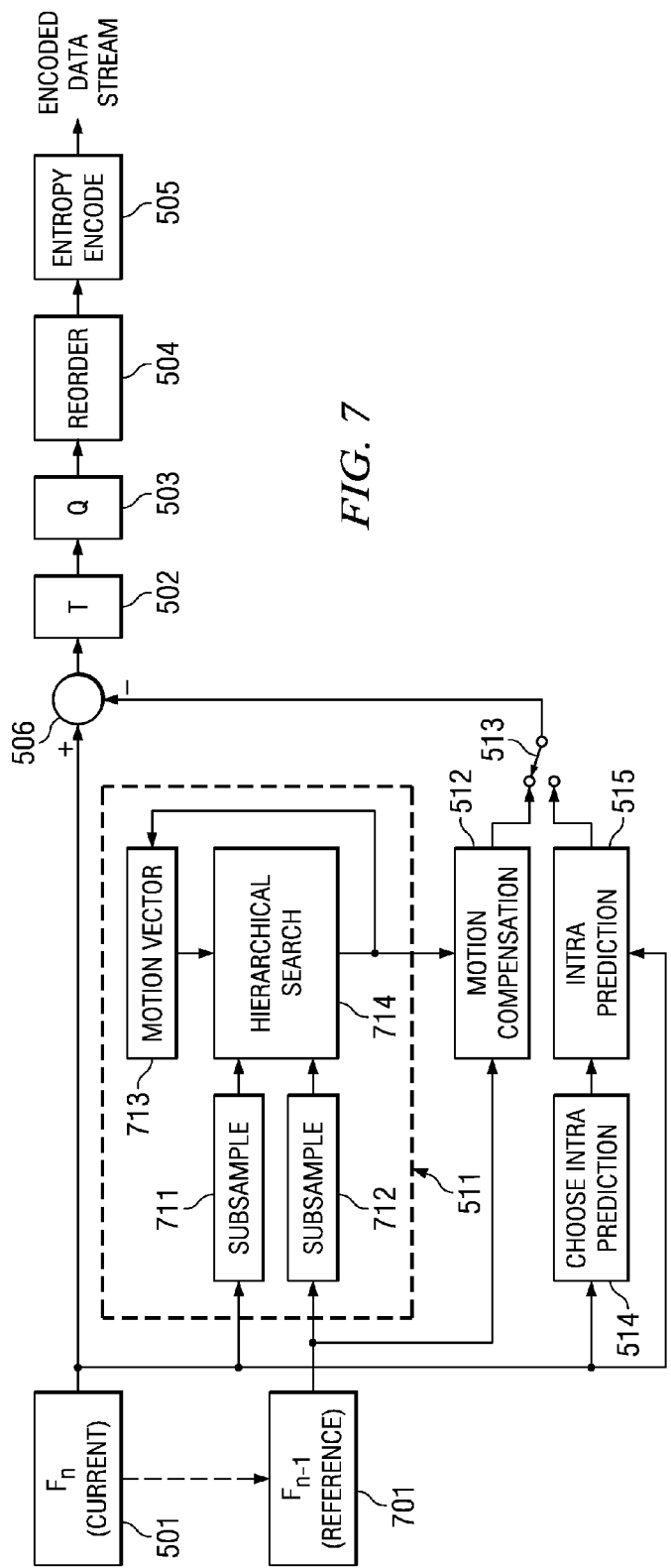
FIG. 7 illustrates a modified video encoding process according to this invention.

FIG. 7 illustrates the encoding process 700 which is a modification of encoding process 500 illustrated in FIG. 5. Reference numerals in FIG. 7 that are the same as those of FIG. 5 illustrate the same structure.

Encoding process 700 begins with the n th frame $F_n$ 501. Frequency transform block 502 transforms a macroblock of the pixel data into the spatial frequency domain. This frequency domain data is quantized in quantization block 503. In accordance with the H.264 standard, in the base profile the macroblock data may be arbitrarily reordered via reorder block 504. The quantized data is encoded by entropy encoding block 505. The resulting entropy encoded data is the encoded data stream.

For inter frame prediction, data from n−1 th frame $F_{n-1}$ 701 and data from the current frame $F_n$ 501 supply motion estimation block 511. As shown in FIG. 7, n−1 th frame $F_{n-1}$ 701 is the prior data of frame $F_n$ 501. Motion estimation block 511 (further described below) determines the positions and motion vectors of moving objects within the picture. This motion data is supplied to motion compensation block 512 along with data from reference frame $F_{n-1}$ 701. The resulting motion compensated frame data is selected by switch 513 for application to subtraction unit 506. Subtraction unit 506 subtracts the inter prediction data from switch 513 from the input frame data from current frame $F_n$ 501. Thus frequency transform block 502, quantization block 503, reorder block 504 and entropy encoding block 505 encode the differential data rather than the original frame data.

The second type of prediction is intra prediction. Intra prediction predicts a macroblock of the current frame from another macroblock of that frame. Encoding process 700 includes choose intra predication unit 514 to determine whether to implement intra prediction. Choose intra prediction unit 514 receives data from current frame $F_n$ 501. Choose intra prediction unit 514 signals intra prediction intra predication unit 515, which also receives data from the reference frame $F_{n-1}$ 701. Switch 513 selects the intra prediction output for application to the subtraction input of subtraction unit 506. In encoding process 700 intra prediction is based upon the reference frame $F_{n-1}$ 701.

Video encoders typically periodically transmit unpredicted frames. In such an event the predicted frame is all 0's. Subtraction unit 506 thus produces data corresponding to the current frame $F_n$ 501 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 700 does not reconstruct the frame for use as a reference. Instead the reference frame $F_{n-1}$ 701 is based on prior data of frame $F_n$ 501. As will be described below, this invention uses sub-sampled data to calculate the motion estimation. Using prior frame data as a reference frame in this computation prevent loss of structural information from a reconstructed frame.

Motion estimation 511 of video encoding 700 operates as follows. Subsample block 711 supplies a sub-sampled block from the current frame $F_n$ 501. Subsample block 712 supplies a sub-sampled block from the reference frame $F_{n-1}$ 701. Block 714 performs a hierarchical motion estimation search as described above and produces a motion vector. Motion vector block 713 stores the motion vector for corresponding blocks of the prior frame. This prior motion vector is used by hierarchical motion estimation search 714 as a starting point for the hierarchical search.

Figure 8:
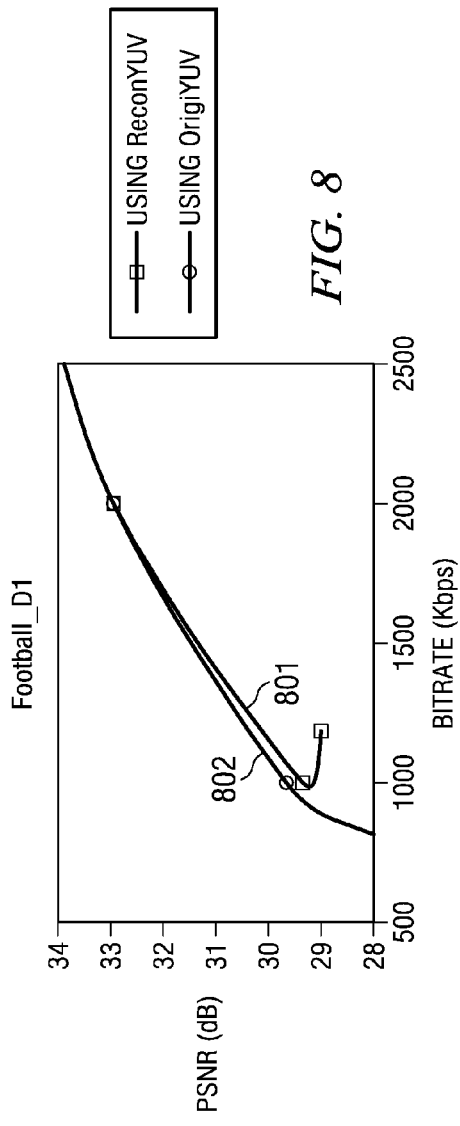
FIG. 8 illustrates a comparison of the curves of picture signal-to-noise ratio versus encoding bit rate of the prior art and this invention for a video sequence.

FIG. 8 illustrates a comparison of the relation between picture signal-to-noise ratio (PSNR) to encoded bit rate for a sample video Football-D1. For curve 801 the motion vector was encoded using sub-sampled data from a prior original frame. For curve 802 the motion vector was encoded using sub-sampled data from a reconstructed reference frame. FIG. 8 illustrates a higher picture signal-to-noise ratio using a prior original frame as reference over the whole of the range of curves 801 and 802.

Figure 9:
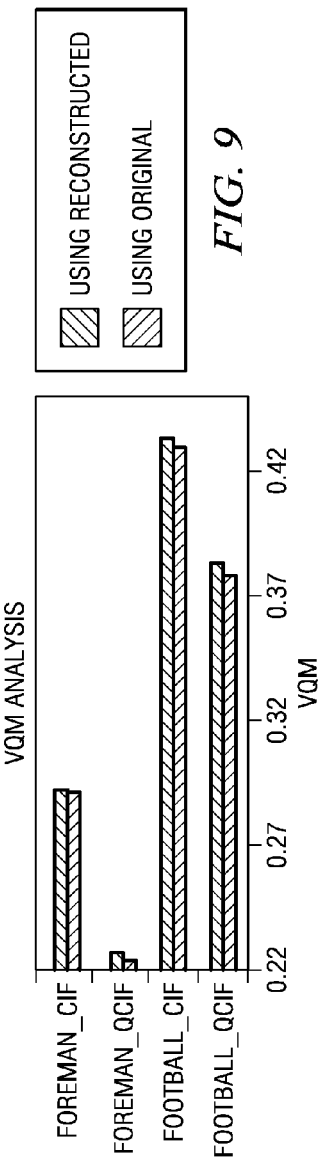
FIG. 9 illustrates a comparison of the visual quality measure of the prior art and this invention for several video sequences.

FIG. 9 illustrates a visual quality measure (VQM) comparison between the prior art and this invention for several video sequences. According to FIG. 9, each encoded video using an original reference frame provides a lower VQM measure than the corresponding encoded video using a reconstructed frame. Note that a lower VQM indicates better quality. Thus this invention is better in every video.

What is claimed is:

1. A method of motion vector video encoding comprising:
sub-sampling a current frame;
sub-sampling a prior original frame, said prior original frame being an original prior frame and not a frame reconstituted from a prior encoded frame;
storing a motion vector previously determined for each block of a prior frame;
finding via a hierarchical search a displacement between each block of the sub-sampled current frame and a corresponding block of the sub-sampled prior original frame that produces a minimum similarity measure, said hierarchical search for each block of the current frame beginning at the stored motion vector for a corresponding block of the prior frame; and
setting a motion vector for each block of the current frame equal to the displacement that produces the minimum similarity measure.

* * * * *